July 19, 1966 R. W. POLLEYS ETAL 3,261,771

METHOD AND APPARATUS FOR ELECTROPLATING ON A PLASTIC WEB HAVING A HIGH RESISTANCE COBALT ALLOY COATING

Filed June 29, 1962

INVENTORS
RHODES W. POLLEYS
JOHN S. JUDGE
BY Bernard M. Goldman
ATTORNEY

United States Patent Office 3,261,771

Patented July 19, 1966

3,261,771

METHOD AND APPARATUS FOR ELECTROPLATING ON A PLASTIC WEB HAVING A HIGH RESISTANCE COBALT ALLOY COATING

Rhodes W. Polleys, Hyde Park, and John S. Judge, Wappingers Falls, N.Y., assignors to International Business Machines Corporation, New York, N.Y., a corporation of New York Filed June 29, 1962, Ser. No. 206,381
2 Claims. (Cl. 204—28)

Figures 1, 2:
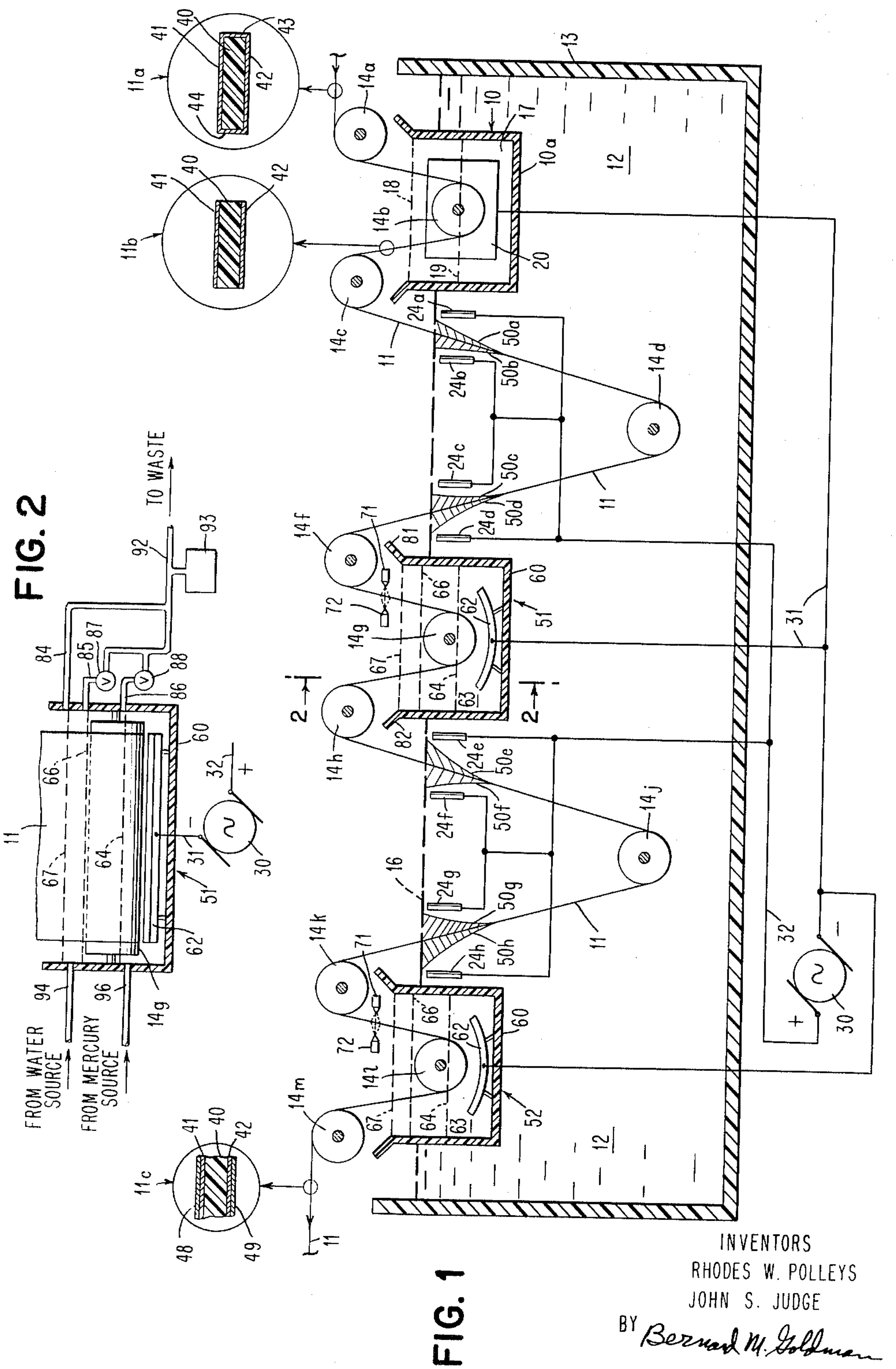

This invention relates to means for conveying electric current to the conducting surface of a moving web while electroplating it.

This invention is particularly useful in the manufacture of magnetic tape which has a final magnetic surface applied by electroplating technique to a very thin and highly resistive conductive under-surface. Such conductive under-surface is applied prior to the electroplating operation by either vacuum deposition or electroless plating on a plastic carrier or substrate, such as a Mylar film. The Mylar film may be initially prepared for the electroless plating preferably in the manner described in U.S. patent application Serial No. 138,609, filed September 18, 1961, now Patent No. 3,142,581, or Serial No. 153,187, filed November 17, 1961, now Patent No. 3,142,582, both of which are assigned to the assignee of the present application. Since the pretreating and chemical plating operations are done prior to applying the present invention, they are not disclosed in detail herein. Thus, the electrolessly plated intermediate layer provides a means for conducting current for the final electroplating operation on the tape and enables adhesion of the final electroplated surface to the plastic carrier.

The final electroplated surface is a material chosen for its magnetic recording and wear properties, such as cobalt or a nickel-cobalt alloy. Thus a controlled electroplated surface can present a very smooth surface with exceptionally good recording properties, and it can withstand abrasion to the point of providing a very long wearing surface in spite of frequent starting, stopping, and rubbing with respect to a read/write head in a magnetic tape transport.

It is exceedingly important that the final electroplated surface be substantially flawless in order to avoid the possibility of recording errors on a magnetic surface. Therefore rough, burned, significant pinhole areas, contaminants, or other imperfections cannot be tolerated on the electroplated surface.

A common type of contact in the prior art is the dry-type roll contact. When used in the above-mentioned manufacture of a plated magnetic tape, it was essential that the tape surface to be plated be completely cleaned and dried after the prior wet electroless plating operation. Otherwise, several undesirable results would occur due to salts carried from the prior plating bath, such as contaminants intermittently forming on the tape surface, and also deforming the roll surface which would result in intermittent and varying resistance areas of contact destroying the useful life of the roll after a short time. These adverse effects can be avoided with the dry-roll contact only by previously cleaning and drying the tape.

It has also been found that with liquid contacts which used salt solutions as their current carrying contact medium, that even though the salt solution did not adversely react with an electroless-plated nickel surface, it did react adversely with respect to a previously electroplated nickel-cobalt surface. Thus the salt-solution contact is primarily useful as a first contact (precontact) for an electroplating operation where the tape leaves the contact to enter the electroplating bath, but the salt-solution contact cannot be satisfactorily used as a later contact in a multistage electroplating operation for manufacturing the tape. A multistage plating operation is where the tape passes over a series of current-conveying contacts and into intervening electroplating baths so that a plurality of electroplated layers are deposited to obtain a desired resultant thickness for the final electroplated surface.

On the other hand, the present invention provides a contact which can convey current to a previously electroplated magnetic cobalt-nickel surface as well as a previously electrolessly plated nickel surface, and can avoid contaminating either of such types of surfaces. Thus the contact of this invention is particularly useful in a multistage electroplated tape manufacturing operation. The invention is particularly useful as a post-contact in an electroplating operation, even though it can operate as a precontact.

Objects of this invention are therefore to provide an electroplating contact:

(1) That is capable of being used as an initial, intermediate or final contact for each of the stages in a multistage magnetic tape electroplating operation.

(2) That is capable of being used as a post contact after an electroplating dip of a magnetic recording tape to enable doubling the plating thickness obtainable in a single electroplating dip, since plating on the highly resistive tape substrate occurs primarily near the surface of the bath.

(3) Wherein a single contact of this invention in practice replaces two dry-type contacts because a contact of this invention can simultaneously provide current to two separate electroplating dips performing separate electroplating operations.

(4) In which no deplating occurs to the contacted surface of the tape, as will occur with salt-solution-type liquid contacts.

(5) Which can be used in a continuous multistage tape manufacturing process without the necessity of cleaning and drying the work-piece prior to engaging the contact.

(6) Which can simultaneously contact either one or both sides of a moving web.

(7) That strips the work-piece of a carried salt-solution film as it enters the current-carrying part of the invention.

(8) Which is self-cleaning and which floats off contaminants during contact operation.

(9) That can convey a large uniform amount of current to a work-piece without having any "high spots" to cause nonuniform current density on the contacted surface.

(10) That cools the work-piece as it conveys current to it.

(11) That coats the exiting current-carrying part of the work-piece with a water film for evaporative cooling after the work-piece leaves the contact and before it enters an electroplating bath.

The invention comprises an electrically conductive liquid metal medium, such as mercury, with a layer of water or other suitable cleaning liquid floating thereon. The conductive liquid contact medium and layer thereon are supported insulatingly from an electroplating bath with which the contact operates. A web being plated and having a resistive conductive film thereon can be passed first through the cleaning liquid layer, then into the liquid contact medium, and out through the cleaning liquid again. The web may be received by the contact either before or after it enters the plating bath, or both.

The foregoing and other objects, features and advantages of the invention will be apparent from the following more particular description of the preferred embodiment of the invention as illustrated in the accompanying drawings.

In the drawings:

FIGURE 1 illustrates an elevational sectional view of a plating operation involving the invention, and FIGURE 2 shows a view of section 2—2 found in FIGURE 1.

In FIGURE 1, a plurality of fluid contacts 10, 51 and 52 are shown partially submerged in a plating bath 12 supported within an insulating container 13. Pre-contact 10 is a salt-solution contact of the type described and claimed in patent application Serial No. 206,307, filed on the same day as the present application and invented by J. S. Judge. Contacts 51 and 52 are intermediate and post contacts for the plating operation shown in FIGURE 1, and they are the subject of the invention claimed by this application.

A path taken by a web 11 being plated is through the series of liquid contacts with intervening dips into the electroplating bath 12. Thus, web 11 passes over a roll 14*a*, through contact means 10, over a roll 14*c*, and makes a first dip into plating bath 12 during which it passes under a roll 14*d* and out of plating bath 12 to a roll 14*f*. From roll 14*f*, web 11 passes through water or other cleaning fluid sprays 71 and 72 that wash both sides of the tape. Then web 11 passes through a layer of water or other cleaning fluid in container 60 into a body of mercury 63 which provides an electroplating contact, in which the web passes under a roll 14*g*. As the web moves out of the mercury contact, it again moves through the layer of water or other cleaning liquid from which the web receives a liquid film which is carried on web 11 as it moves through the air over roll 14*h* and makes a second dip into electroplating bath 12. During the second dip, the web repeats the previous dip cycle and passes under a roll 14*j*, moves out of bath 12 over a roll 14*k*, through another set of sprays 71 and 72, into the next contact 52, which is identical to contact 51, from which it travels out over roll 14*m*. The rolls may have fluid bearing surfaces of the type described in U.S. patent application Serial No. 170,141, filed January 31, 1962 titled "Method and Apparatus for Producing Magnetic Recording Materials" by G. W. Greene et al.

A magnified cross-section 11*a* illustrates the electroless metal coating on web 11 before it enters contact 10. In Section 11*a*, web 11 comprises a plastic substrate 40, preferably Mylar plastic, having been previously coated electrolessly with nickel on both flat surfaces 41 and 42 and both edges 43 and 44 by a method such as is described in U.S. Patent No. 2,658,841 to Gutzeit et al., after prior preparation by either of the above-cited patent application Nos. 138,609 or 153,187, followed by a treatment such as described in a Bergstrom U.S. Patent No. 2,702,253.

As previously stated salt-solution contact 10 is the subject of another patent application Serial No. 206,307, filed June 29, 1962, the same day as the present application and assigned to the same assignee as the present application. Therefore, salt-solution contact 10 will not be described herein in detail. Briefly, however, contact 10 comprises an insulating container 10*a* which includes a roll 14*b* supported between current conveying plates 17. The salt solution in contact 10 is basically the same as the solution of bath 12. However, extra buffering is provided for the solution within contact 10. The level of salt solution is controlled to not exceed level 19 for plating only on one side of the web, or level 18 is used for plating on both sides of the web. The negative terminal of a current source 30 is connected by a lead 31 to the pair of plates 17 (of which only one is visible in FIGURE 1). Salt-solution contact 10*a* performs several functions preliminary to electroplating, which are (1) it activates the electroless surface by slightly deplating it to remove contamination which might have collected on it so that effective electroplating is obtainable; (2) it scribes (removes) the electroless metal from edges 43 and 44 of the web so that electroplating henceforth can continue independently on the opposite sides of the tape, or on only one side if desired; and (3) it provides current for the first electroplating step. Magnified cross-section 11*b*, illustrates the cross-section of web 11 after it exits from contact 10. Thus it is seen that electroless edges 43 and 44 have been removed by contact 10.

When web 11 leaves contact 10 on its way to bath 12, it is carrying electric current received within contact 10. The current path is from the positive terminal of source 30 through leads 32 to a pair of anodes 24*a* and *b*, through bath 12 to the opposite web surfaces 41 and 42, along the web contact 10, through its salt solution to plates 17, and to the opposite side of source 30. While the current is passing through the very resistive web surfaces 41 and 42, heat is generated that raises the web temperature. A liquid film is acquired on the web in each contact 10, 51 and 52, and the film provides evaporative cooling while the web is passing through the air to the bath, or the bath to the contact, and being heated by current. At any given web velocity, air temperature and humidity conditions, there will be a minimum "critical" length, beyond which it can be expected that the evaporative cooling film is gone.

Thus more current can be carried by the web by maintaining the web length between contact 10 and bath 12 less than the minimum "critical" length.

The longer the web path through the air, the greater is its total resistance to current flow and the higher must be the potential of generator 30 to obtain a required current in the web. Thus greater power efficiency is obtained by maintaining the current carrying web length as short as possible. This minimizes the capacity for current source 30.

As web 11 enters bath 12, it immediately dissipates current at a very high maximum current density adjacent the surface 16 of bath 12. The current density decreases asymptotically to a negligible amount within four or five inches of the surface 16 of bath 12. Curves 50*a* and *b* illustrate the current-density distribution on opposite sides of web 11 (assuming equal current being carried on both web sides). The current density at any point on either side of web 11 is proportional to the horizontal distance from that web point to either curve 51*a* or *b*. This current distribution is explained in greater detail in prior U.S. patent application No. 165,806, now Patent No. 3,175,154, filed January 12, 1962 by H. Koretzky, B. Leland and R. W. Polleys, and assigned to the same assignee as the present application. The anodes 24*a* and *b* are provided adjacent to the sides of the web near surface 16 where the current density substantially exists. If the tape is to be plated only on one side, then only a single anode 24*a* and current distribution 50*a* are provided.

Consequently, the current imparted to the tape by precontact 10 is dissipated substantially by the time the tape moves to the point where curves 50*a* and *b* appear to intersect web 11 in FIGURE 1, which is within a few inches of the surface of bath 12. No plating of the tape can further occur during this first dip into bath 12, during which it passes under roll 14*d* and out of the bath, unless additional current is imparted to the tape by a post-dip contact engaging the tape after it leaves the first dip. This requirement is fulfilled by a second liquid contact 51 which basically differs from contact 10.

Second contact 51 permits a second plating operation on the web during its first dip in bath 12, which is represented in FIGURE 1 by a second set of current-density distribution curves 50*c* and *d*. The second electroplating operation involves greater current-carrying capacity for the web because of the increased thickness of the metal on the web due to the first electroplating operation. Hence the resistance to current per unit length of the conducting surface of the web between contact 51 and bath 12 is lower than during the first current carrying air run and consequently it has greater current-carrying capacity for a given temperature rise, assuming the length of the run is the same. A greater plating thickness is therefore obtained during the second plating operation than the first.

Contact 51 comprises a nonconducting container 60 which has a current-carrying metal plate 62 supported near the bottom of container 60. Plate 62 is curved in the direction of roll 14*g*. Plate 62 is connected by a lead 31 to the negative side of current source 30. A mercury liquid 63 fills the bottom volume of container 60. The level of mercury 63 is either 64 or 66 depending on whether it is required to electroplate on one or both sides of web 11. A layer of water floats on the top surface of mercury 63, and the water reaches a level 67 in container 60. The water flows from the sprays 71 and 72 down the sides of the tape to float on the mercury contact. The upper walls of container 60 have overhangs 81 and 82 to catch drippage from the tape and any overspray.

The fluid levels 67 and 64 or 66 within contact 60 are established by piping shown in FIGURE 2, which represents sections 2—2 of contact 51 in FIGURE 1. Thus in FIGURE 2, there is shown a set of three overflow pipes 84, 85 and 86. Overflow 84 establishes water level 67 and overflows excess water which is always accumulating due to sprays 71 and 72 and/or from a water inlet pipe 94. Contamination in or on the surface of the water is passed by pipes 84 and 92 to a waste receptacle. The required level 64 or 66 for the mercury determines which of overflow pipe 85 or 86 is used. Valve 88 is opened to use overflow 86, if it is desired to establish mercury level 64. However, valve 88 is closed and valve 87 is opened if it is desired to use overflow 85 to establish mercury level 66. Both valves 87 and 88 have their outputs connected to waste pipe 92. Any mercury overflowing will be collected in a trap 93 which has its top opening connected to the bottom of waste pipe 92.

Once a required mercury level is established, the selected overflow pipe 85 or 86 acts to pass off contamination which float to the surface of the mercury but which is too heavy to float on the water surface. Also soluble contamination, such as aqueous salts, is passed through all available overflows because of the continuously changing water content on contact 51, due to sprays 71 and 72. Accordingly, means has been provided for continuously water cleaning contact 51 during its electrical operation to float away all contamination which is soluble in heavier or lighter than water, nonsoluble in mercury; and lighter than mercury. Thus no significant concentration of bath salt solution can occur in the water bath floating on the mercury surface.

Due to the fact that the density of the mercury is greater than that of the salt solution and any known contamination, whatever aqueous salt solution remains on the web surface after passing through the water is instantly removed by floatation as soon as the tape moves beneath the surface of the mercury. Accordingly, a dry and clean web surface is automatically presented to the mercury which conveys electrical current to it. Furthermore, the relative movement between the web and mercury causes the contact surface between the mercury and web to continuously change. No deplating occurs in the mercury.

Any contamination which forms on the surface of the mercury is removed by overflowing it through selected overflow pipe 85 or 86 when fresh mercury is added through a small-diameter mercury inlet pipe 96 which terminates below the surface of the mercury in order not to disturb the formation of contaimination on the mercury surface.

The current path in contact 60 is largely from the web surface through the mercury to plate 62. Very little of the current is passed to the tape through the water bath above the mercury, because the resistivity of the water is greater than for the mercury, and a longer current flow path is necessary through the combined water and mercury paths to plate 62.

While in the mercury, the opposite sides of the tape are substantially shunted through the mercury to receive nearly equal voltage, and hence acquire substantially equal currents. The resistive length of the web before and after it engages contact 51 also tends to equalize the voltage on both sides of the web within contact 51.

Atfer the tape leaves contact 51, it passes over roll 14*h* to make a second dip into the plating bath 12. Thus intermediate contact 51 is a post contact for the first electroplating dip, and a pre-contact for the second electroplating dip.

Upon entrance into bath 12 during the second dip, the tape receives a third electroplating operation due to the current acquired in contact 51. This current also dissipates quickly within bath 12 as shown by curves 50*e* and *f* to electroplate a third layer on both sides of the tape. Because the resistance of the web surface is lowered by each electroplating operation, more current can be carried for each subsequent plating operation and a greater electroplated thickness is added during each subsequent operation. Hence, this third operation acquires a greater added plating thickness than the second, which was greater than the first. A second mercury contact 52, identical to contact 51, permits a fourth plating operation to occur before the web leaves the second dip. The current imparted by post contact 52 provides the current-density distribution represented shown by curves 50*g* and *h*. Since contact 52 is identical in construction to contact 51, it will not be explained in further detail herein.

The number of contacts and dips provided are determined by the overall thickness required for the electroplated metal on the tape, which for example may be twenty microinches.

The final surfaces of the tape when plated on both sides are shown in cross-section 11*c* found in FIGURE 1. It is seen that the electroplated surfaces 48 and 49 adhere to the electroless metal surfaces 41 and 42 respectively.

If it is desired to plate only on one side of the web, rolls 14*b*, *g* and *l* can be made of an insulating material such as glass, ceramic or an organic plastic. Teflon plastic has the advantage of not being wetted by mercury, so that mercury can not tend to move between the tape and the Teflon roller. With the mercury level 64, only the outer side 42 of the web will be exposed to the mercury, because the mercury is maintained at or below the points where the tape separates from the roll. Since the current does not substantially travel through the much more resistive water solution floating on the mercury, there is little tendency of current to pass through the water to the opposite side of the tape.

Where the scribing action of the first contact 10 is not required such as where plating on all sides of the tape is desired, it may be eliminated; and there will remain only one or more post-type mercury contacts, such as 51 and 52. In such case, the electroless tape is passed over roll 14*a* directly into the first dip without having any pre-contact. In this case there will be no initial electroplating upon the first entrance of the web into bath 12. Nevertheless, this initial part of the first dip without plating is desirable because the previously coated electroless nickel is usually somewhat passive and may not be suitable for adherent electroplating. Hence, the initial period for web 11 in bath 12 serves to activate the electroless surface for subsequent electroplating and the first electroplating operation will occur, in this case as illustrated by curves 50*c* and *d* near the exiting of the web from the first dip.

While the specific embodiment uses mercury, any suitable conductive liquid metal can be used instead, which is compatible with the metal surface of the web and the plating bath salts. Such alternative metals are low melting temperature metals such as bismuth, gallium, low-melting indium alloys. The melting temperature cannot exceed that temperature which would harm the web.

Water sprays 71 and 72 are optional; but if they are not used, then other means, such as inlet pipe 94, should be used to cause the water to be at least periodically changed on the respective contacts 51 and 52.

Although water has been used as the specific cleaning fluid layer on the mercury in the desired embodiment, it is realized that any liquid can be used as the cleaning fluid provided it does not react with either the mercury or metal plating, removes contaminants by solvation and/or floation is nonconductive relative to the mercury, is capable of significant evaporative cooling, and is either compatible or immiscible with respect to electroplating bath 12.

No current is provided to the initial web portion entering first contact 10 or the final web portion leaving last contact 52 by having no current return path from those sections of the web back to source 30.

If the containers 10*a* or 60 are made of conductive metal, they can serve the dual function of also being the current-conveying means; and separate plates 20*a*–20 need not be provided. In this case, the negative terminal of source 30 is connected to the conductive container, and it is insulatingly supported from bath 12.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Electroplating apparatus including a current contact for a plastic web coated with a resistive cobalt alloy being moved through said contact between first and second electroplating baths, in which an anode in each bath is connected to a positive side of a current source, comprising a container supporting a body of mercury fluid for receiving said web therein between said baths, said container supporting said mercury fluid insulatingly from said bath, conductive means engaging said mercury fluid, a terminal for connecting said conductive means to a negative terminal of said current source, a roll made of insulating material supporting in said mercury fluid for asymetrically causing plating current to be distributed to the opposite sides of said web, a web moving arrangement for passing said web into said mercury fluid and around the bottom of said roll to engage said bottom while in said mercury, said container providing for supporting a layer of water on said mercury to clean the surface of said web entering said contact and to provide an aqueous cooling film on the primary current-carrying resistive surface of said web exiting from said contact, and the distance between said contact and said first and second baths being proportioned so that an evaporative-cooling aqueous film always remains on said resistive current carrying surface while it is passing between said contact and each of said baths.

2. A method of electroplating a plastic web having a high resistance cobalt alloy coating which comprises the steps of:

advancing said web from a first electroplating bath into a contacting body of liquid mercury, advancing said web from said body of liquid mercury into a second electroplating bath, insulating one side of said web from said body of liquid mercury by passing said one side in contact with an insulating roll in said body of liquid mercury to force substantially all electroplating current to pass through the other side of said web as it is advanced between each bath and the contacting body of mercury, connecting said mercury to a negative terminal of a power source having its positive terminal connected to each electroplating bath, floating a layer of water over said mercury body, and passing said web over a non-evaporative distance between said layer of water and said plating baths.

References Cited by the Examiner

UNITED STATES PATENTS

| | | | |
|---|---|---|---|
| 2,882,214 | 4/1959 | Summers et al. | 204—206 |
| 2,933,438 | 4/1960 | Lancy | 204—206 |
| 2,936,278 | 5/1960 | Shoemaker et al. | 204—206 |
| 2,953,507 | 9/1960 | Palme | 204—206 |

References Cited by the Applicant

UNITED STATES PATENTS

| | | |
|---|---|---|
| 1,068,410 | 7/1913 | Chubb. |
| 1,068,411 | 7/1913 | Chubb. |
| 1,565,683 | 12/1925 | Swain. |
| 2,667,453 | 1/1954 | Murray. |
| 3,227,635 | 1/1966 | Koretzky et al. |

JOHN H. MACK, *Primary Examiner.*

H. S. WILLIAMS, W. VAN SISE, *Assistant Examiners.*